United States Patent
Mizutani

(10) Patent No.: US 8,378,549 B2
(45) Date of Patent: Feb. 19, 2013

(54) ELECTRIC MOTOR

(75) Inventor: Nobuo Mizutani, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 294 days.

(21) Appl. No.: 12/801,470

(22) Filed: Jun. 10, 2010

(65) Prior Publication Data

US 2010/0320857 A1 Dec. 23, 2010

(30) Foreign Application Priority Data

Jun. 17, 2009 (JP) ................................ 2009-144329

(51) Int. Cl.
*H01R 39/38* (2006.01)
*H02K 13/00* (2006.01)

(52) U.S. Cl. .......................... 310/239; 310/242; 310/248

(58) Field of Classification Search .................. 310/239, 310/83, 242, 248

See application file for complete search history.

(56) References Cited

U.S. PATENT DOCUMENTS

| | | | | |
|---|---|---|---|---|
| 4,778,354 | A | * | 10/1988 | Idei .............................. 417/366 |
| 4,922,149 | A | * | 5/1990 | Isozumi et al. ................. 310/89 |
| 2002/0149283 | A1 | | 10/2002 | Hager et al. |
| 2006/0170296 | A1 | * | 8/2006 | Nakajima et al. ............... 310/89 |
| 2006/0244321 | A1 | * | 11/2006 | Mizutani ..................... 310/68 R |
| 2007/0029143 | A1 | * | 2/2007 | Adachi et al. ................ 188/72.8 |
| 2007/0034459 | A1 | * | 2/2007 | Matsushita et al. .......... 188/72.6 |
| 2007/0188027 | A1 | * | 8/2007 | Sakamaki et al. .............. 310/51 |
| 2008/0203836 | A1 | * | 8/2008 | Mizutani ........................ 310/83 |

* cited by examiner

*Primary Examiner* — Quyen Leung
*Assistant Examiner* — Alex W Mok
(74) *Attorney, Agent, or Firm* — Posz Law Group, PLC

(57) ABSTRACT

Each of a plurality of brushes is tilted relative to an imaginary plane that is perpendicular to a rotational axis of an armature and is placed on one axial side of a brush holder, at which an interior of a yoke housing is located. A radial inner end part of each brush has a slide contact surface, which is generally parallel to the rotational axis of the armature and slidably contacts an outer peripheral surface of a commutator. At least a portion of the slide contact surface of each brush is axially disposed outside of an opening of the yoke housing.

10 Claims, 4 Drawing Sheets

CONNECTED TO WORM SHAFT

ELECTRIC MOTOR

CROSS REFERENCE TO RELATED APPLICATION

This application is based on and incorporates herein by reference Japanese Patent Application No. 2009-144329 filed on Jun. 17, 2009.

BACKGROUND OF THE INVENTION

1. Field of the Invention

The present invention relates to an electric motor, which includes brushes that slidably contact a commutator.

2. Description of Related Art

In one type of previously known electric motor, brushes slidably contact a commutator, which is fixed to a rotatable shaft to rotate integrally therewith. Electric power is supplied to the commutator through the brushes.

Japanese Unexamined Patent Publication No. 2003-523708A (corresponding to US 2002/0149283A1) discloses one such motor. In this motor, a commutator is placed axially outward of a yoke housing, which is configured into a cup shaped body. Brushes, which slidably contact the commutator, are held by a brush holder at outside of the yoke housing. Furthermore, in this motor, an electronic control unit (ECU) is placed in parallel with the commutator and the brush holder at a location, which is on one axial side of the yoke housing in the direction of the axis of the rotatable shaft that projects from the yoke housing. In this way, the axial length of the yoke housing is made shorter than the yoke housing of the other type of motor, which receives the commutator and the brush holder in the yoke housing.

In the case of the motor of Japanese Unexamined Patent Publication No. 2003-523708A (corresponding to US 2002/0149283A1), at the time of installing the brushes to the brush holder, the installation locations of the brushes on the brush holder are located outside of the yoke housing, i.e., are located at the gear housing side, and thereby the brushes are installed to the brush holder from the gear housing side. Because of this construction, after the installation of the yoke housing and the brush holder, the entire assembly, to which the yoke housing and the brush holder are installed, needs to be inverted such that the yoke housing bottom side is placed at the lower side of the assembly, and the brush holder side is placed at the upper side of the assembly. Thereafter, the brushes are installed to the brush holder, which is now placed at the upper side of the assembly. This results in the tedious assembling process.

In contrast, in the case of the motor, in which the brush holder is entirely received in the yoke housing, the brushes can be installed to the brush holder from the yoke housing side. Therefore, it is not required to invert the brush holder. However, in the case of this type of motor, the brush holder is entirely received in the yoke housing. Thereby, the entire axial length of the yoke housing is disadvantageously lengthened. Thus, it has been demanded to address such a disadvantage.

SUMMARY OF THE INVENTION

The present invention addresses the above disadvantages. According to the present invention, there is provided an electric motor that includes a yoke housing, which has an opening at one axial end part of the yoke housing, an armature, which has a commutator and is rotatably received in the yoke housing, and a brush holder, which is installed to the opening of the yoke housing and guides a plurality of brushes in a slidable manner. Each of the plurality of brushes is tilted relative to an imaginary plane that is perpendicular to a rotational axis of the armature and is placed on one axial side of the brush holder, at which an interior of the yoke housing is located. A radial inner end part of each of the plurality of brushes has a slide contact surface, which is generally parallel to the rotational axis of the armature and slidably contacts an outer peripheral surface of the commutator. At least a portion of the slide contact surface of each of the plurality of brushes is axially disposed outside of the opening of the yoke housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

With reference to the attached drawings, an embodiment of the present invention will be described. In this embodiment, the present invention is implemented in an electric motor that serves as a drive power source of a power window system of a vehicle.

Figure 1:
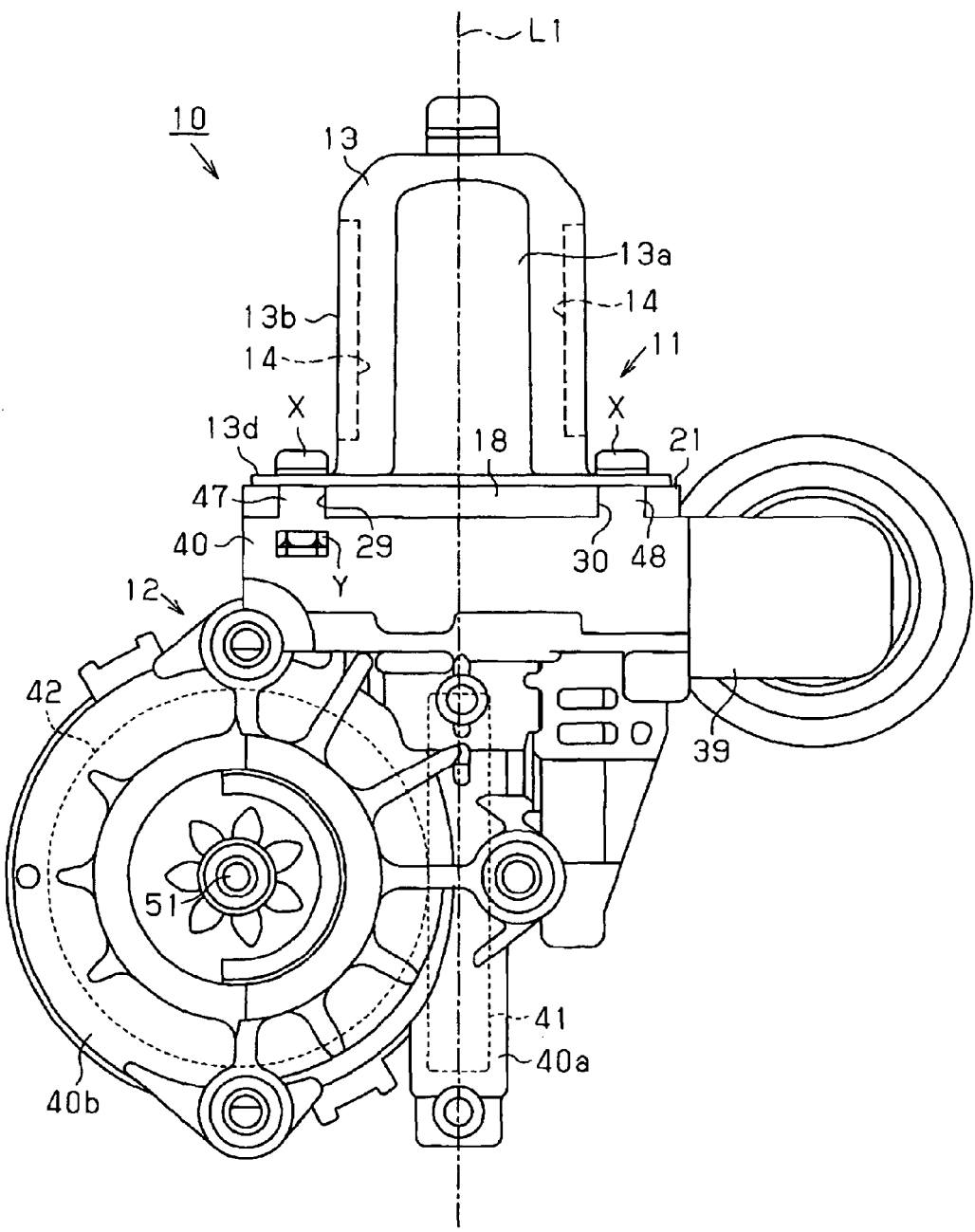
FIG. 1 is schematic plan view of an electric motor according to an embodiment of the present invention.

FIG. 1 is a schematic diagram showing the electric motor 10 of the present embodiment. The motor 10 is a direct current electric motor, which is used to drive the power window system installed on the vehicle. The motor 10 includes a motor main body 11 and a speed reducer 12.

Figure 2:
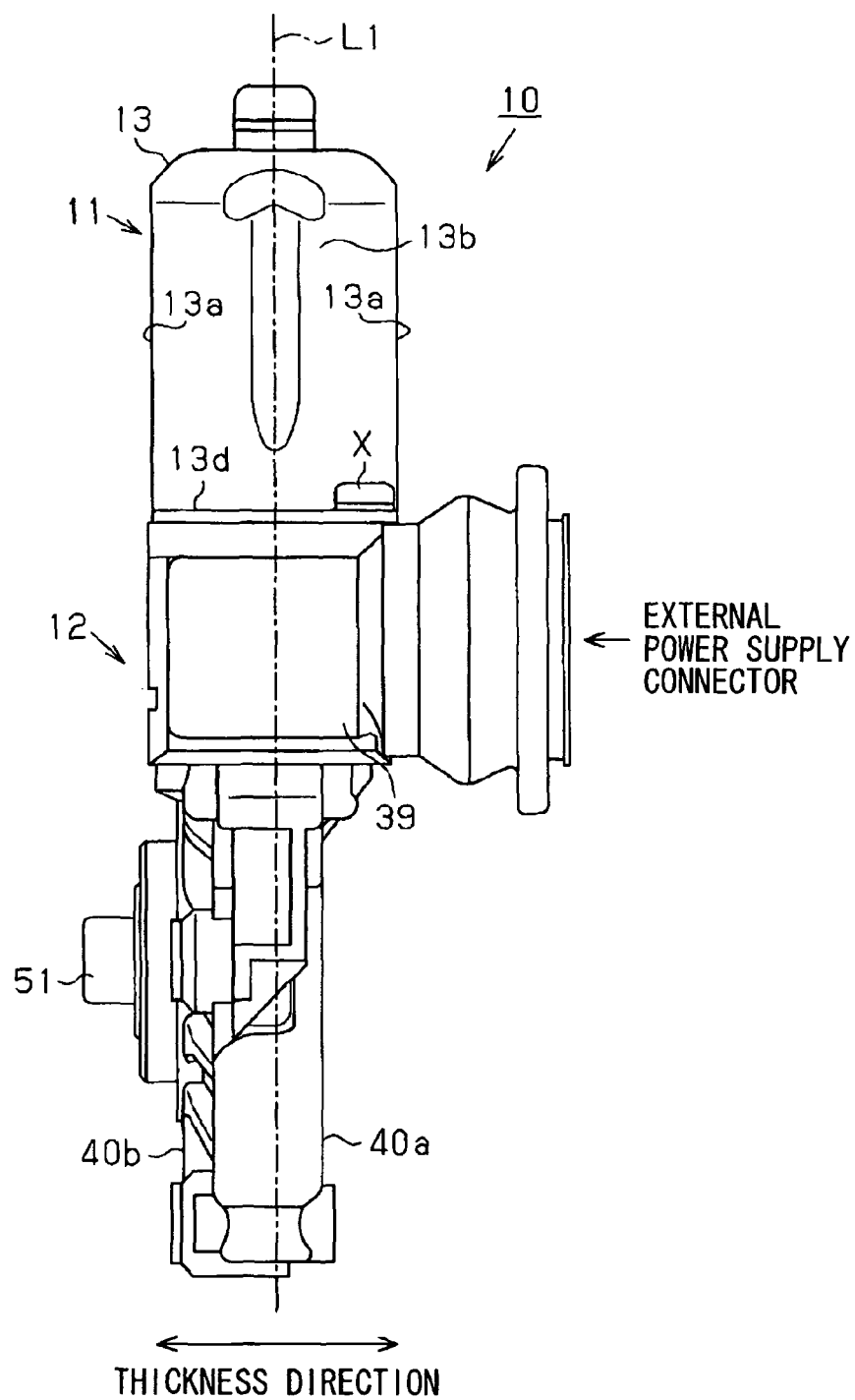
FIG. 2 is a side view of the motor of the embodiment.
Figure 3:
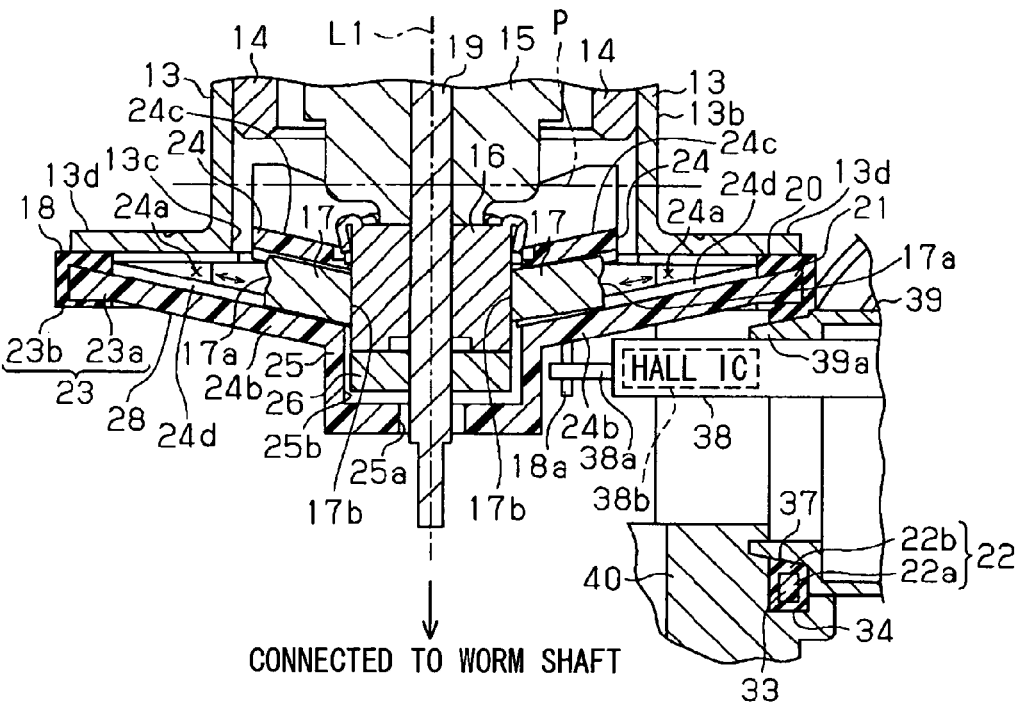
FIG. 3 is a partial enlarged cross-sectional view of the motor, showing a structure for installing a brush holder to the motor according to the embodiment.

With reference to FIGS. 1 to 3, the motor main body 11 includes a yoke housing 13, two permanent magnets 14, an armature 15, a commutator 16, two brushes 17 and a brush holder 18.

The yoke housing 13 is made of magnetic metal and is configured into a generally flat cup shaped body. In the yoke housing 13, two planar surfaces 13a are connected together by two curved surfaces 13b. The magnets 14 are fixed to interior surfaces, respectively, of the yoke housing 13, which are located inside of the curved surfaces 13b, respectively. The armature 15 is placed radially inward of the magnets 14. The armature 15 has a rotatable shaft 19. A proximal end part (an upper end part in FIGS. 1 to 3) of the rotatable shaft 19 is rotatably supported by a bearing (not shown) that is held at a center of a bottom wall of the yoke housing 13. The commutator 16 is fixed to a distal end part of the rotatable shaft 19 at an opening 13c of the yoke housing 13.

Two flanges 13d are formed at the opening 13c of the yoke housing 13 to extend radially outwardly (leftward and rightward in FIG. 1) from the curved surfaces 13b, respectively. A screw hole (not shown) is formed in each of the flanges 13d to receive a screw X therethrough. The brush holder 18 is clamped between the yoke housing 13 and a gear housing 40 described later to place the brush holder 18 at the opening 13c of the yoke housing 13.

The brush holder 18 is formed as a single piece component and includes a brush holder main body 20 and a connector mount frame 22. The brush holder main body 20 is configured into an oblong rectangular form in a view taken in the axial direction. The brush holder main body 20 is placed between the yoke housing 13 and the gear housing 40. The connector mount frame 22 projects from a transverse frame wall portion 21 located at one longitudinal end of the brush holder main body 20 (at the right longitudinal end of the brush holder main body 20 in FIG. 3).

The brush holder main body 20 includes a holder base portion (frame portion) 23 and a holder interior portion 28. The holder interior portion 28 is formed continuously from the holder base portion 23 at inward of the holder base portion 23.

The holder base portion 23 includes a main body side base member 23a and a main body side seal member 23b. The main body side base member 23a extends in a direction perpendicular to a direction of an axis (rotational axis) L1 of the rotatable shaft 19 and is made of a resin material. The main body side seal member 23b is molded integrally with the main body side base member 23a and covers an outer surface of main body side base member 23a.

The holder interior portion 28 has a commutator receiving portion 25, which serves as a cover portion, at a center area of the holder interior portion 28. The commutator receiving portion 25 is configured into a cup shaped body and axially projects from the rest of the holder interior portion 28 toward the gear housing 40 side. A receiving hole 25a extends through a bottom wall of the commutator receiving portion 25 and is adapted to receive the rotatable shaft 19 therethrough. An axial end part of the commutator 16 and a sensor magnet 26 are received in the commutator receiving portion 25. The commutator 16 is installed to the distal end part of the rotatable shaft 19, and the sensor magnet 26 is placed on a distal end side of the commutator 16 where the distal end of the rotatable shaft 19 is located. The commutator 16 and the sensor magnet 26 are installed to the rotatable shaft 19 in such a manner that the commutator 16 and the sensor magnet 26 are rotated integrally with the rotatable shaft 19.

The holder interior portion 28 has two brush holding portions 24, which receive the brushes 17, respectively. These brush holding portions 24 are opposed to each other about the commutator receiving portion 25 in the longitudinal direction (the left-to-right direction in FIG. 3) of the brush holder main body 20. Each brush holding portion 24 is configured into a generally rectangular tubular form that extends in the longitudinal direction of the brush holder main body 20. A radially inner end part of the brush holding portion 24 opens at a location adjacent to an inner peripheral surface 25b of the commutator receiving portion 25. The brush holding portion 24 is tilted to obliquely extend toward the commutator 16 side (toward the radially inner side) such that the brush holding portion 24 is tilted at a predetermined angle (e.g., 70 to 85 degrees) relative to the axis L1 of the rotatable shaft 19 from the one axial side, at which the yoke housing 13 is located, to the other axial side (to the gear housing 40 side), which is opposite from the yoke housing 13.

In other words, the brush holding portion 24 is tilted by a predetermined angle (e.g., 5 to 20 degrees) relative to an imaginary plane P that is perpendicular to the axis L1 of the rotatable shaft 19 and is placed on one axial side of the brush holder 18, at which the interior of the yoke housing 13 is located. In this way, the brush 17 is supported by the brush holding portion 24 such that the brush 17 is tilted by the predetermined angle (e.g., 5 to 20 degrees) relative to the imaginary plane P, so that an axial distance between a radially inner end part of the brush 17 and the imaginary plane P is larger than an axial distance between a radially outer end part of the brush 17 and the imaginary plane P.

A radially inner part of the brush holding portion 24, which is adjacent to the commutator 16, forms a protruding portion 24b that axially protrudes from the opening 13c of the yoke housing 13 and the holder base portion 23 (the main body side base member 23a). The protruding portion 24b serves as a gear housing side guide wall of the brush holding portion 24. The brush holding portion 24 also has a yoke housing side guide wall 24c, and two opposed lateral side guide walls 24d. At the one axial side of the brush holder 18, at which the interior of the yoke housing 13 is located, the brush 17 is guided by these guide walls 24b-24d in a slidable manner in a predetermined direction (a radial direction indicated by a double sided arrow in FIG. 3), which is tilted by the predetermined angle (e.g., 5 to 20 degrees) relative to the imaginary plane P.

An insertion opening 24a is formed at a radially outer part of the brush holding portion 24. The insertion opening 24a is configured to enable insertion of the brush 17, which is configured into the rectangular column form, into the interior of the brush holding portion 24 through the insertion opening 24a. The radially outer end part 17a of the brush 17 is urged radially inwardly (toward the commutator 16) by a spring (not shown). A slidable contact surface 17b, which is formed at the radially inner end part of the brush 17 urged by the spring, slidably contacts the commutator segments, which are arranged one after another in the circumferential direction along the outer peripheral surface of the commutator 16. The slide contact surface 17b of the brush 17 is a curved surface, which is generally parallel to the axis L1 of the rotatable shaft 19 and is generally arcuately curved in the circumferential direction along the surfaces of the commutator segments of the commutator 16. The insertion openings 24a of the brush holding portions 24 are opposed to the flanges 13d, respectively, of the yoke housing 13 in the direction of the axis L1 and are closed by the flanges 13d, respectively. At this time, the radially outer end surfaces of the brushes 17, which are slidably received in the brush holding portions 24, are electrically connected to two holder side terminals 18a, respectively, which extend downward from the brush holder main body 20 (the holder interior portion 28), through pig tails (not shown), respectively. The pig tails are placed such that the pig tails do not interfere with the yoke housing 13.

Figure 4:
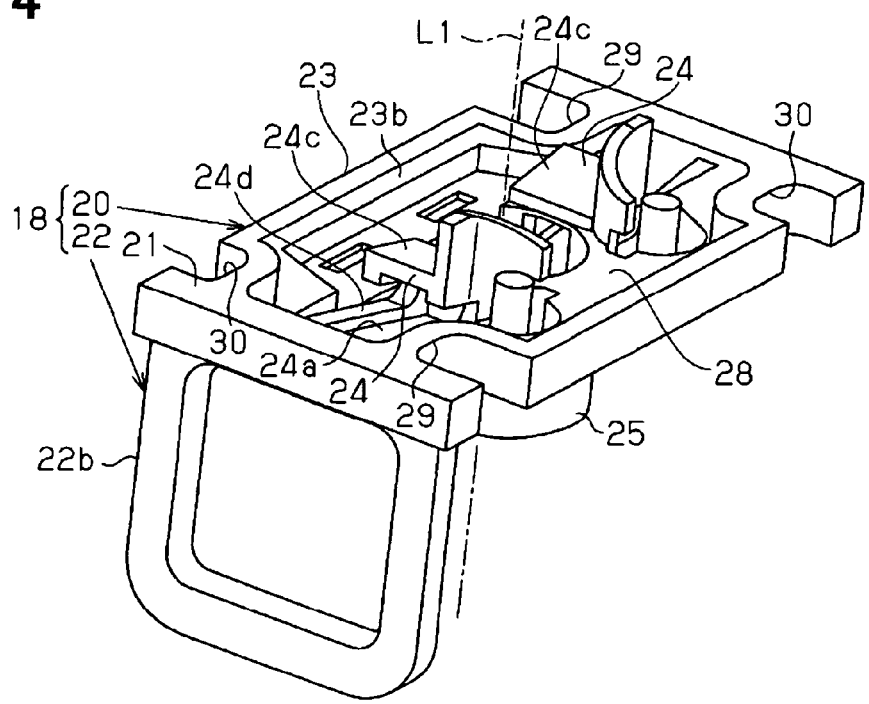
FIG. 4 is a perspective view of a brush holder of the motor of the embodiment.

With reference to FIG. 4, in the brush holder main body 20, a generally rectangular recess 29 and a generally rectangular recess 30 are formed at opposed longitudinal end parts, respectively, of each longitudinal frame wall portion of the holder base portion 23, which extends in the longitudinal direction of the brush holder main body 20. The diagonally opposed recesses 29, which are diagonally opposed to each other at the holder base portion 23, are configured to have generally the identical shape, and the other diagonally opposed recesses 30, which are diagonally opposed to each other at the holder base portion 23, are configured to have generally the identical shape. In this embodiment, the diagonally opposed recesses 29 are larger than the diagonally opposed recesses 30. These recesses 29, 30 are configured to correspond with projections 47, 48, respectively, which are formed in the gear housing 40 described below.

The connector mount frame 22 of the brush holder 18 has a mount frame side base member 22a and a mount frame side seal member 22b. The mount frame side base member 22a is molded integrally with the main body side base member 23a of the brush holder main body 20, and the mount frame side seal member 22b covers an entire outer surface of the mount frame side base member 22a and is molded integrally with the mount frame side base member 22a (see FIG. 5).

Figure 5:
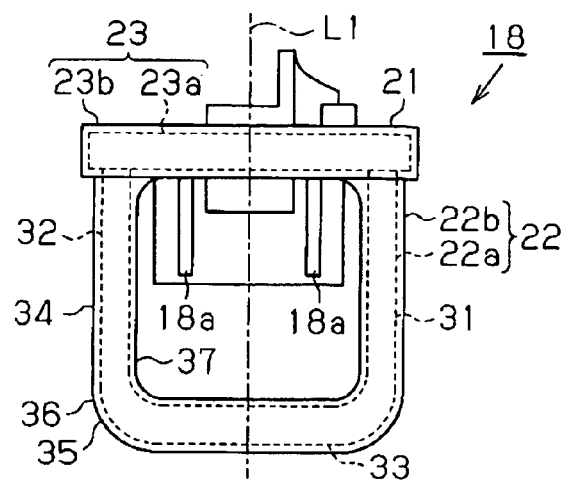
FIG. 5 is a side view showing the brush holder of the embodiment.
Figure 6:
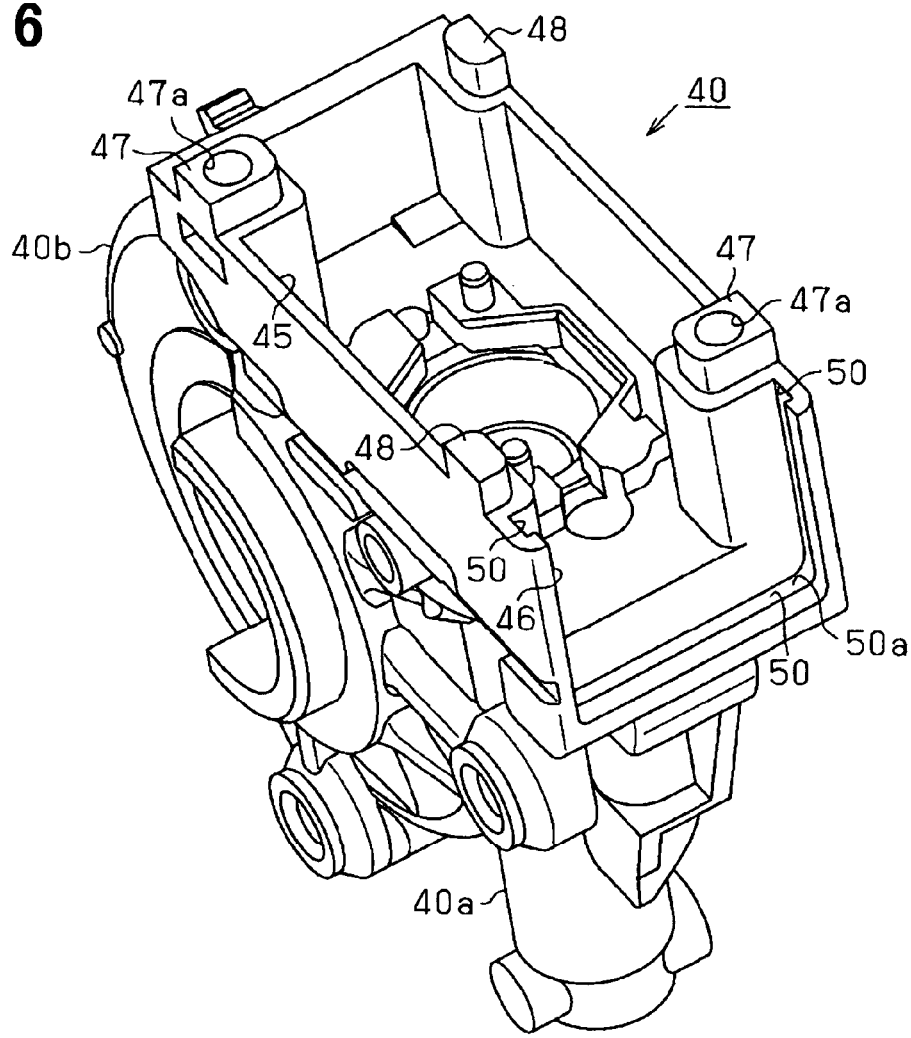
FIG. 6 is a perspective view of a gear housing of the motor of the embodiment.

The mount frame side base member 22a is made of a resin material and extends from the bottom surface of the transverse frame wall portion 21 in the direction of the axis L1 of the rotatable shaft 19. With reference to FIG. 5, the mount frame side base member 22a of the connector mount frame 22 includes two extending portions 31, 32 and a connecting portion 33. The extending portions 31, 32 are generally parallel to each other and extend from two opposed end parts, respectively, of the transverse frame wall portion 21 in the direction of the axis L1. The connecting portion 33 connects distal end parts of the extending portions 31, 32 to form a generally rectangular frame.

In the mount frame side seal member 22b, which covers the mount frame side base member 22a, a curved portion 36 is formed at a corner part 35 at a lower end side (the projecting end side) of an outer peripheral part 34 of the connector mount frame 22.

The mount frame side seal member 22b and the main body side seal member 23b are made of an elastic seal maternal (elastomer) and are integrally molded. Specifically, in the state where the main body side base member 23a of the brush holder main body 20 and the mount frame side base member 22a of the connector mount frame 22 are integrally molded, the seal members 23b, 22b are integrally molded by, for example, a coinjection molding process.

With reference to FIG. 3, a distal end portion 39a of a connector 39, which has an electronic control unit (ECU) 38, is detachably installed to an inner peripheral portion 37 of the connector mount frame 22 such that an outer peripheral part of the distal end portion 39a tightly contacts the seal member 22b. At this time, as shown in FIGS. 1 and 2, the connector 39 is installed to the connector mount frame 22 in a direction (an installation direction, an insertion direction), which is perpendicular to a thickness direction (the left-to-right direction in FIG. 2) of the motor 10 and the direction of the axis L1. That is, the connector 39 is installed to the connector mount frame 22 in the direction that generally coincides with a planar direction (a direction perpendicular to the plane of FIG. 2) of the motor 10. Therefore, it is possible to minimize an increase in a size of the motor 10 in the thickness direction of the motor 10, which would be caused by the connector 39. Thereby, the generally flat structure (the low profile) of the motor 10 can be maintained. Furthermore, the connector 39 is stably fixed to the gear housing 40 by, for example, a screw or a hook (not shown) besides the distal end portion 39a discussed above. A connecting direction, i.e., an installation direction of an external power supply connector (not shown) to the connector 39 is set to be generally perpendicular to the planar direction of the motor 10.

The ECU 38, which is provided in the connector 39, has a plurality of ECU side terminals 38a provided at a distal end side of the connector 39. Two of these ECU side terminals 38a are electrically connected to the two holder side terminals 18a of the brush holder 18 when the connector 39 is installed to the connector mount frame 22 in the installation direction. When the vehicle side external power supply connector (not shown) is connected to the connector 39, the electric power is supplied to the brushes 17 through the ECU side terminals 38a. The ECU 38 has Hall ICs 38b. The Hall ICs 38b sense a change in the magnetic flux of the sensor magnet 26 caused by the rotation of the rotatable shaft 19 through corresponding remaining ones of the ECU side terminals 38a, which are not connected to the holder side terminals 18a of the brush holder 18. Alternatively, the ECU 38 may be further projected toward the commutator receiving portion 25 to place Hall elements (not shown) of the Hall ICs 38b adjacent to the commutator receiving portion 25 to directly sense the change in the magnetic flux caused by the rotation of the rotatable shaft 19 without using the ECU side terminals 38a. In this way, the rotational position and the number of rotations per unit time of the sensor magnet 26 (and thereby of the rotatable shaft 19) are sensed by the ECU 38 with the Hall ICs 38b through the commutator receiving portion (the cover) 25.

The speed reducer 12, which is installed to the motor main body 11, includes the gear housing 40, a worm shaft 41, a worm wheel 42 and a clutch (not shown). In the present embodiment, the worm shaft 41 and the worm wheel 42 form a speed reducing mechanism, which reduces the rotational speed of the rotatable shaft 19.

The gear housing 40 is made of a resin material and includes a worm receiving portion 40a and a wheel receiving portion 40b, as shown in FIGS. 1 and 2. The worn receiving portion 40a extends in the direction of the axis L1 of the rotatable shaft 19. The wheel receiving portion 40b projects in a direction perpendicular to the direction of the axis L1 of the rotatable shaft 19 generally in parallel with the planar surfaces 13a of the yoke housing 13, i.e., in the planar direction. The worm shaft 41 and the clutch (not shown) are received in the worm receiving portion 40a. The worm wheel 42, which is meshed with the worm shaft 41, is received in the wheel receiving portion 40b.

The gear housing 40 has an axial end opening (upper end side opening) 45, which is opposed to the opening 13c of the yoke housing 13 at a yoke housing side end of the gear housing 40 and is configured into a generally oblong rectangular shape. A longitudinal direction of the axial end opening 45 of the gear housing 40 is generally parallel to the planar direction of the motor 10 discussed above. At a side surface of the gear housing 40, a side opening 46 continuously extends in the direction of the axis L1 from one longitudinal end of the oblong rectangular axial end opening 45, at which the connector mount frame 22 is located to connect with the connector 39. The side opening 46 is configured into a generally square shape.

Projections 47, 48 axially project at four corners of the axial end opening 45 of the gear housing 40. The recesses 29 are engaged with the projections 47, respectively, and the recesses 30 are engaged with the projections 48, respectively. Two screw holes 47a are formed in the two projections 47 among the four projections 47, 48, to receive the screws X, respectively. The brush holder 18 (specifically, the holder base portion 23, on which the main body side seal member 23b is formed) is clamped between the axial end opening 45 of the gear housing 40 and the opening 13c of the yoke housing 13. Then, the screws X are inserted through the screw holes 47a, respectively, and are threadably tightened against nuts Y, respectively, which are held at the gear housing 40. At this time, the brush holder 18 (specifically, the holder base portion 23 having the main body side seal member 23b) is clamped between the gear housing 40 and the yoke housing 13, so that the main body side seal member 23b seals the connection between the gear housing 40 and the brush holder 18 as well as the connection between the yoke housing 13 and the brush holder 18.

A groove 50 is continuously formed along three inner surfaces of the side opening 46 to extend from the axial end opening 45 such that the groove 50 corresponds to the connector mount frame 22 of the brush holder 18. A corner part 50a of the groove 50 located at the lower side (the axial side opposite from the yoke housing 13) of the side opening 46 is curved. Furthermore, the size of the groove 50 in the longitudinal direction of the brush holder main body 20 is set to be slightly smaller than the size of the seal member 22b of the connector mount frame 22 in the longitudinal direction of the brush holder main body 20 (for instance, the size of the groove 50 in the longitudinal direction of the brush holder main body 20 being set to be equal to or smaller than 95% of the size of the seal member 22b in the thickness direction of the seal member 22b, i.e., in the longitudinal direction of the brush holder main body 20). With this setting, the seal member 22b is compressed when the connector mount frame 22 is received in the groove 50.

The worm shaft 41 (see FIG. 1), which is received in the worm receiving portion 40a, is rotatably supported by bearings (not shown), which are installed in the worm receiving portion 40a. Furthermore, the worm shaft 41 is coupled with the rotatable shaft 19, which extends from the motor main body 11, through the clutch (not shown), so that the worm shaft 41 is rotated by the rotational drive force, which is transmitted from the rotatable shaft 19 through the clutch (not shown). Here, it should be understood that the clutch is constructed to operate as follows. That is, the clutch transmits the drive force from the rotatable shaft 19 to the worm shaft 41 while the clutch disables transmission of a drive force from the worm shaft 41 to the rotatable shaft 19 by locking the rotation of the worm shaft 41.

The worm shaft 41 is meshes with the worm wheel 42 (see FIG. 1). The worm wheel 42 is connected to an output shaft 51, which extends in a direction generally perpendicular to the rotational axis of the worm shaft 41, to transmit the drive force from the worm wheel 42 to the output shaft 51. The output shaft 51 is connected to a regulator of a known wire type, which raises or lowers a window glass to close or open a window opening of a door of the vehicle. When the output shaft 51 is rotated, the regulator is driven to raise or lower the window glass to close or open the window opening of the door.

As discussed above, in the motor 10, each of the brush holding portions 24 is tilted to obliquely extend toward the commutator 16 side (toward the radially inner side) at the predetermined angle relative to the axis L1 of the rotatable shaft 19 from the one axial side, at which the yoke housing 13 is located, to the other axial side, which is opposite from the yoke housing 13 (to the gear housing 40 side). Therefore, the brush 17 can be installed to the brush holding portion 24 from the one axial side, at which the yoke housing 13 is located. Furthermore, the radially inner side portion of the brush holding portion 24, which is adjacent to the commutator 16, axially protrudes from the opening 13c of the yoke housing 13 away from the yoke housing 13. Therefore, in comparison to the prior art motor, which receives the brush holder (the brush holding portions) in the yoke housing, it is possible to limit or minimize the axial length of the yoke housing 13 by the amount, which corresponds to the axial protruding amount of the radially inner side portion of the brush holding portion 24, which axially protrudes from the opening 13c of the yoke housing 13 according to the present embodiment.

Each of the flanges 13d of the yoke housing 13 is axially opposed to the insertion opening 24a of the corresponding brush holding portion 24, and the majority of this insertion opening 24a is closed by the flange 13d. Therefore, unlike the prior art motor, which receives the brush holder in the yoke housing, it is not necessary to increase the size of the portion of the yoke housing, which receives the brush holder, to have the stepped shape of the yoke housing. Therefore, the outer diameter (profile) of the yoke housing can be minimized. In other words, a cross-sectional area of the interior of the yoke housing 13, which is measures along a plane perpendicular to the axis L1, is generally constant from an axial part of the yoke housing 13 located adjacent to an axial end part (an upper end part in FIG. 1) of each permanent magnet 14, which is axially opposite from the opening 13c of the yoke housing 13, to the opening 13c of the yoke housing 13 along the axis L1.

The holder interior portion 28 of the brush holder 18 has the commutator receiving portion 25, which serves as the cover portion that covers the outer peripheral surface and the bottom part (axial end surface) of the axial end portion of the commutator receiving portion 25. Therefore, it is possible to limit or minimize the dispersion of brush abrasion dust (powder), which is generated from the brush 17 upon the rotation of the commutator 16 due to the slide contact between the commutator 16 and the brush 17.

The longitudinal direction of the brush holding portion 24 generally coincides with the extending direction of the flange 13d. Therefore, it is possible to limit or minimize the increase in the radial size of the motor.

Next, advantages of the present embodiment will be described.

(1) The brush holder main body 20 of the brush holder 18 includes the holder base portion 23 and the holder interior portion 28, and the holder interior portion 28 is formed continuously from the holder base portion 23. The holder interior portion 28 includes the commutator receiving portion 25 and the brush holding portions 24. The commutator receiving portion 25 has the receiving hole 25a, through which the rotatable shaft 19 is received. The brush holding portions 24 extend continuously from the holder base portion 23. Each brush holding portion 24 guides the brush 17 toward the commutator 16 side (toward the radially inner side) in the slidable manner in the direction, which is tilted relative to the axis L1 of the rotatable shaft 19 from the one axial side, at which the yoke housing 13 is located, to the other axial side (to the gear housing 40 side), which is opposite from the yoke housing 13. Thereby, the radially inner end part of the brush holding portion 24, which is adjacent to the commutator 16, axially protrudes from the opening 13c of the yoke housing 13 toward the other axial side (toward the gear housing 40 side), which is opposite from the yoke housing 13. In this way, the brush 17 can be installed to the brush holding portion 24 from the yoke housing 13 side. Furthermore, in comparison to the prior art motor, which receives the brush holder (the brush holding portions) in the yoke housing, it is possible to limit or minimize the axial length of the yoke housing 13 by the amount, which corresponds to the axial protruding amount of the radially inner end part of the brush holding portion 24, which axially protrudes from the opening 13c of the yoke housing 13, according to the present embodiment.

(2) The flanges 13d are provided to the cup shaped yoke housing 13 such that the flanges 13d extend radially outwardly from the opening 13c. At the yoke housing 13 side of the brush holding portion 24, there is provided the insertion opening 24a, through which the brush 17 is inserted into the brush holding portion 24. The insertion opening 24a is placed at the location, which corresponds to, i.e., is opposed to the flange 13d in the direction of the axis L1 of the rotatable shaft 19. With this construction, unlike the prior art motor, which receives the brush holder in the yoke housing, it is not necessary to increase the size of the portion of the yoke housing, which receives the brush holder, and thereby to have the stepped shape of the yoke housing. Therefore, the outer diameter (profile) of the yoke housing can be minimized.

(3) The commutator receiving portion 25, which serves as the cover portion that covers the outer peripheral surface of the commutator 16, is provided at the side of the holder base portion 23, which is opposite from the yoke housing 13. Therefore, it is possible to limit or minimize the dispersion of brush abrasion dust (powder), which is generated due to the slide contact between the commutator 16 and the brush 17.

(4) The sensor magnet 26 and the ECU 38 form a rotation sensing apparatus (rotation sensing means), which senses the rotation of the rotatable shaft 19. Specifically, the sensor magnet 26 is provided to the rotatable shaft 19 to rotate integrally with the rotatable shaft 19 and serves as a sensing subject device. The ECU 38 has the Hall ICs 38b, which serve as a rotation sensing device and is opposed to the sensor magnet 26 through the commutator receiving portion 25 to sense the rotation of the sensor magnet 26. The rotation of the sensor magnet 26 is sensed with the ECU 38 having the Hall ICs 38b through the commutator receiving portion 25, so that the number of rotations of the rotatable shaft 19 and the rotational position of the rotatable shaft 19 are sensed by the ECU 38.

(5) The worm shaft 41 and the worm wheel 42 form the speed reducing mechanism, which reduces the rotational speed of the rotatable shaft 19, and are received in the gear housing 40. The holder base portion 23 is clamped between the yoke housing 13 and the gear housing 40. That is, the holder base portion 23 is placed outside of the yoke housing 13 and the gear housing 40, and thereby the ratio of the interior space of the yoke housing 13, which is occupied by the brush holder 18, is reduced, and thereby the axial length of the yoke housing 13 can be reduced.

The above embodiment of the present invention may be modified as follows.

In the above embodiment, the insertion opening 24a of the brush holding portion 24 is opposed to the flange 13d of the yoke housing 13 in the direction of the axis L1. Alternatively, the insertion opening 24a of the brush holding portion 24 may be modified such that the insertion opening 24a of the brush holding portion 24 is not opposed to the flange 13d of the yoke housing 13.

In the above embodiment, the dispersion of the brush abrasion dust (powder), which is generated from the brush 17 upon the rotation of the commutator 16 due to the slide contact between the commutator 16 and the brush 17, is limited by the commutator receiving portion 25, which serves as the cover portion. Alternatively, the commutator receiving portion 25 may be eliminated.

In the above embodiment, the ECU 38, which has the Hall ICs 38b, and the sensor magnet 26 form the rotation sensing apparatus (the rotation sensing means), which senses the rotation of the rotatable shaft 19. Alternatively, the Hall ICs 38b may be provided separately from the ECU 38, and the Hall ICs 38b and the sensor magnet 26 may form the rotation sensing apparatus (the rotation sensing means).

In the above embodiment, the sensor magnet 26 and the commutator 16 are received in the commutator receiving portion 25. Alternatively, the location of the sensor magnet 26 may be changed to. any other appropriate location, which is other than the interior of the commutator receiving portion 25.

In the above embodiment, the worm shaft 41 and the worm wheel 42 are provided to form the speed reducing mechanism. Alternatively, the speed reducing mechanism may be eliminated from the motor 10 by using the rotatable shaft 19 of the motor 10 as the output shaft of the motor 10.

In the above embodiment, the motor of the present invention is used as the power window motor of the power window system. However, the application of the motor of the present invention may be changed to any other ones, such as a wiper motor or the like.

Additional advantages and modifications will readily occur to those skilled in the art. The invention in its broader terms is therefore not limited to the specific details, representative apparatus, and illustrative examples shown and described.

What is claimed is:

1. An electric motor comprising:
a yoke housing that has an opening at one axial end part of the yoke housing;
an armature that has a commutator and is rotatably received in the yoke housing; and
a brush holder that is installed to the opening of the yoke housing and guides a plurality of brushes in a slidable manner, wherein:
each of the plurality of brushes is tilted relative to an imaginary plane that is perpendicular to a rotational axis of the armature and is placed on one axial side of the brush holder, at which an interior of the yoke housing is located;
a radial inner end part of each of the plurality of brushes has a slide contact surface, which is generally parallel to the rotational axis of the armature and slidably contacts an outer peripheral surface of the commutator;
at least a portion of the slide contact surface of each of the plurality of brushes is axially disposed outside of the opening of the yoke housing;
the yoke housing includes at least one flange, which radially outwardly extends from the opening of the yoke housing;
the brush holder includes a plurality of brush holding portions that receive the plurality of brushes, respectively;
each of the plurality of brush holding portions has an insertion opening that is placed at a radially outer end part of the brush holding portion and is adapted to install the corresponding one of the plurality of brushes therethrough into an interior of the brush holding portion; and
the insertion openings of the plurality of brush holding portions open toward the at least one flange in an axial direction parallel to the rotation axis of the armature and are directly opposed to the at least one flange in the axial direction.

2. The electric motor according to claim 1, wherein the slide contact surface of each of the plurality of brushes is entirely axially disposed outside of the opening of the yoke housing.

3. The electric motor according to claim 1, wherein an axial distance between the radially inner end part of each of the plurality of brushes and the imaginary plane is larger than an axial distance between a radially outer end part of the brush and the imaginary plane.

4. The electric motor according to claim 1, wherein the plurality of brushes is placed on the one axial side of the brush holder, at which the interior of the yoke housing is located.

5. The electric motor according to claim 1, wherein: the brush holder includes a holder base portion, which contacts the yoke housing at a location radially outward of the opening of the yoke housing, and a holder interior portion, which is formed continuously from the holder base portion and includes the plurality of brush holding portions, respectively; and at least a portion of each of the plurality of brush holding portions, which is placed adjacent to the commutator, axially protrudes outwardly from the opening of the yoke housing.

6. The electric motor according to claim 5, wherein the holder'interior portion has a cover portion that covers the outer peripheral surface of an axial end part of the commutator.

7. The electric motor according to claim 6, further comprising a rotation sensing apparatus that senses rotation of a rotatable shaft of the armature, to which the commutator is installed to rotate integrally therewith, wherein the rotation sensing apparatus includes:
   a sensing subject device, which is provided to the rotatable shaft to rotate integrally with the rotatable shaft; and
   a rotation sensing device, which is opposed to the sensing subject device through the cover portion.

8. The electric motor according to claim 1, further comprising a gear housing that receives a speed reducing mechanism, which reduces a rotational speed of a rotatable shaft of the armature, to which the commutator is installed to rotate integrally therewith, wherein the brush holder is clamped between the yoke housing and the gear housing.

9. The electric motor according to claim 1, further comprising a plurality of permanent magnets fixed to the yoke housing at an interior of the yoke housing, wherein a cross-sectional area of the interior of the yoke housing is generally constant from an axial part of the yoke housing located adjacent to an axial end part of each of the plurality of permanent magnets, which is axially opposite from the opening of the yoke housing, to the opening of the yoke housing along the rotational axis of the armature.

10. The electric motor according to claim 1, wherein:
   each of the plurality of brush holding portions includes at least one guide wall that radially outwardly extends linearly in a predetermined direction, which is tilted relative to the imaginary plane;
   each of the plurality of brushes slidably contacts a slide surface of the at least one guide wall; and
   the slide surface of the at least one guide wall radially outwardly extends to a position that is radially outward of the opening of the yoke housing.

* * * * *